United States Patent [19]

Koukal et al.

[11] Patent Number: 4,722,265
[45] Date of Patent: Feb. 2, 1988

[54] FRESH AIR SUPPLY DEVICE IN A MOTOR VEHICLE

[75] Inventors: Heinz Koukal; Klaus Arold, both of Sindelfingen; Hans Trube, Herrenberg, all of Fed. Rep. of Germany

[73] Assignee: Daimler-Benz Aktiengesellschaft, Stuttgart, Fed. Rep. of Germany

[21] Appl. No.: 72,039

[22] Filed: Jul. 10, 1987

[30] Foreign Application Priority Data

Jul. 12, 1986 [DE] Fed. Rep. of Germany ....... 3623635
Mar. 31, 1987 [DE] Fed. Rep. of Germany ....... 3710753

[51] Int. Cl.⁴ .............................................. B60H 3/06
[52] U.S. Cl. ...................................... 98/2.17; 98/2.11
[58] Field of Search ................. 98/2, 2.07, 2.11, 2.16, 98/2.17

[56] References Cited

U.S. PATENT DOCUMENTS

| | | | |
|---|---|---|---|
| 2,011,840 | 8/1935 | Arnold et al. | 98/2.17 |
| 2,796,820 | 6/1957 | Moore et al. | 98/2.07 |
| 3,301,161 | 1/1967 | Attwood et al. | 98/2.07 |
| 4,242,951 | 1/1981 | Bemiss | 98/2.16 X |
| 4,437,393 | 3/1984 | Stulz et al. | 98/2.17 |
| 4,597,323 | 7/1986 | Mordau et al. | 98/2.11 |

FOREIGN PATENT DOCUMENTS

| | | | |
|---|---|---|---|
| 3223812 | 12/1983 | Fed. Rep. of Germany | 98/2.17 |
| 3330951 | 8/1985 | Fed. Rep. of Germany . | |
| 39924 | 4/1981 | Japan | 98/2.16 |

Primary Examiner—Harold Joyce
Attorney, Agent, or Firm—Barnes & Thornburg

[57] ABSTRACT

A fresh air supply device in a motor vehicle which is installed in an accessories compartment. The engine compartment partition and passenger compartment partition which adjoin the accessories compartment are joined together in the center of the vehicle by means of a frame in which a lower trough-like casing part equipped with a blower is suspended from above. A water separator forming an integral component part of the upper casing part disposed on the lower casing part surrounds an upwardly projecting connection piece carrying a fine filter by its collecting vessel and by the two water outlets leading away therefrom.

8 Claims, 2 Drawing Figures

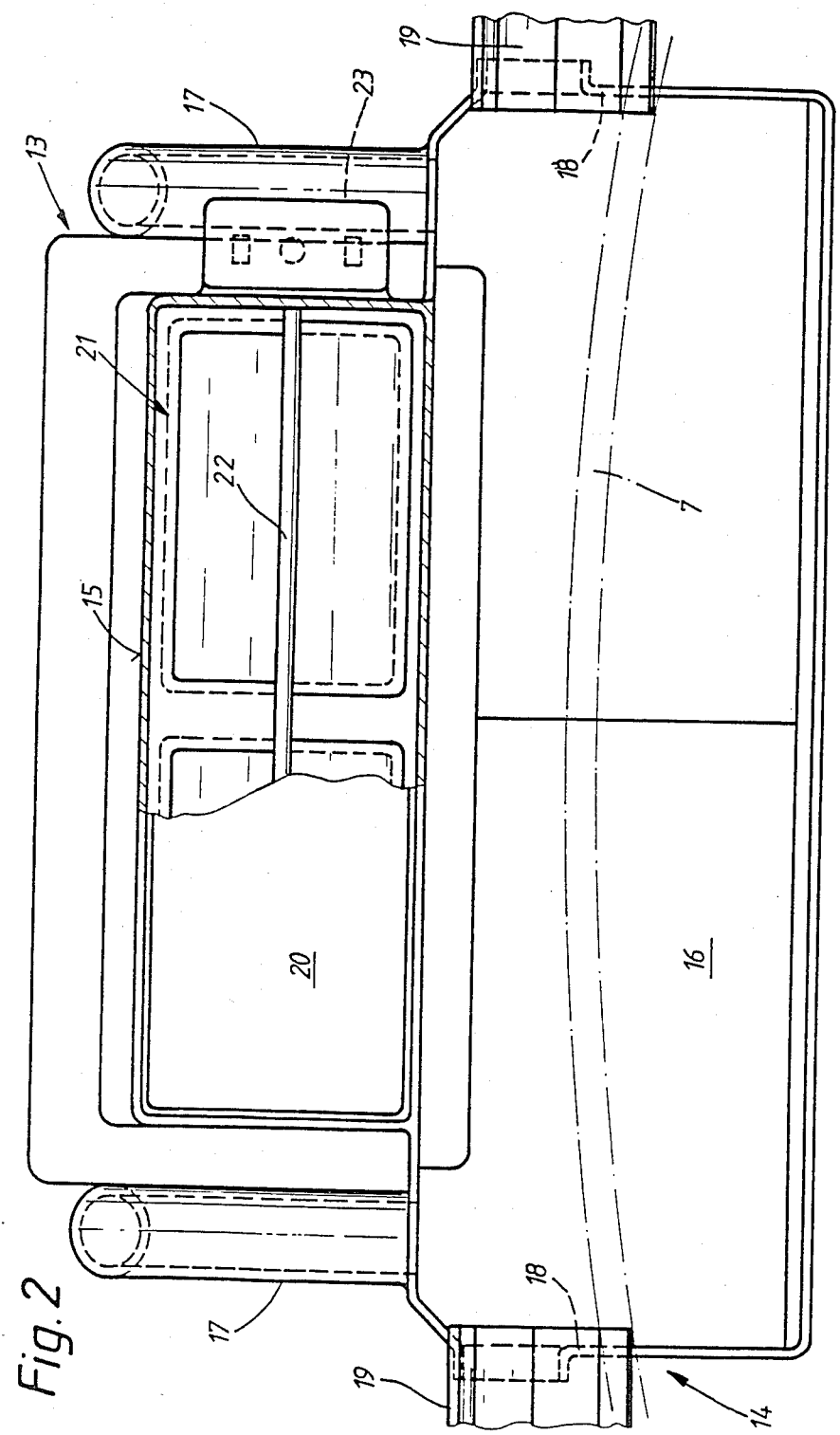

FRESH AIR SUPPLY DEVICE IN A MOTOR VEHICLE

BACKGROUND AND SUMMARY OF THE INVENTION

The invention relates to a fresh air supply device disposed in a motor vehicle and installed in a compartment provided for accessories and having two closure walls lying spaced apart in the longitudinal direction of the vehicle and formed by an engine compartment partition and a front passenger compartment partition. The compartment also has side parts formed by side parts of the vehicle body. The accessories compartment is covered over by a swivelable hood forming between it and the adjoining windscreen a gap through which fresh air flows to an upper casing part which is constructed as a component unit and with which are associated, in addition to a water separator, a coarse filter and a fine filter which is adapted to be removed in the upward direction. The upper casing part is disposed on a lower casing part equipped with a blower.

A fresh air supply device of this general kind is known from German Pat. No. (DE PS) 33 30 951, in which the two casing parts constitute independent, functionally unconnected parts, while the upper casing part in particular takes up a great deal of space and is complicated to install.

The problems underlying the invention are that of providing a fresh air supply device which is in the form of a constructional unit comprising compact, functionally cooperating regions, and which is simple to service and in addition is also simple to install.

The present invention solves these problems by providing an arrangement wherein the engine compartment partition and the front passenger compartment partition are connected together in the center of the vehicle by means of a frame in which is suspended from above a bottom trough-like casing part which is equipped with the blower and is merely supported by means of seals on the front passenger compartment partition, wherein a water separator, which forms an integral component part of the upper casing part disposed thereon, partly surrounds by its collecting vessel and by two water outlets leading away therefrom, an upwardly projecting connection piece holding the fine filter.

Short diversion paths with intensive separation, together with easy access to the fine filter, are achieved if the fine filter is covered by a removable air scoop which carries the coarse filter on the air inlet side in certain preferred constructions.

A compact construction is obtained if the fine filter is followed on the connection piece side by a flap arrangement which shield by means of a holder mounted on the outside of the connection piece and operated by a drive unit covered over by the scoop according to certain preferred embodiments.

As a further development of certain embodiments of the invention, the collecting vessel is provided with side cutouts in which water collection channels extending almost to the windscreen pillars are suspended.

Other objects, advantages and novel features of the present invention will become apparent from the following detailed description of the invention when considered in conjunction with the accompanying drawings.

BRIEF DESCRIPTION OF THE DRAWINGS

FIG. 2 is a plan view of the fresh air supply device shown in FIG. 1, with the connection piece shown partly in section.

DETAILED DESCRIPTION OF THE DRAWINGS

Figure 1:
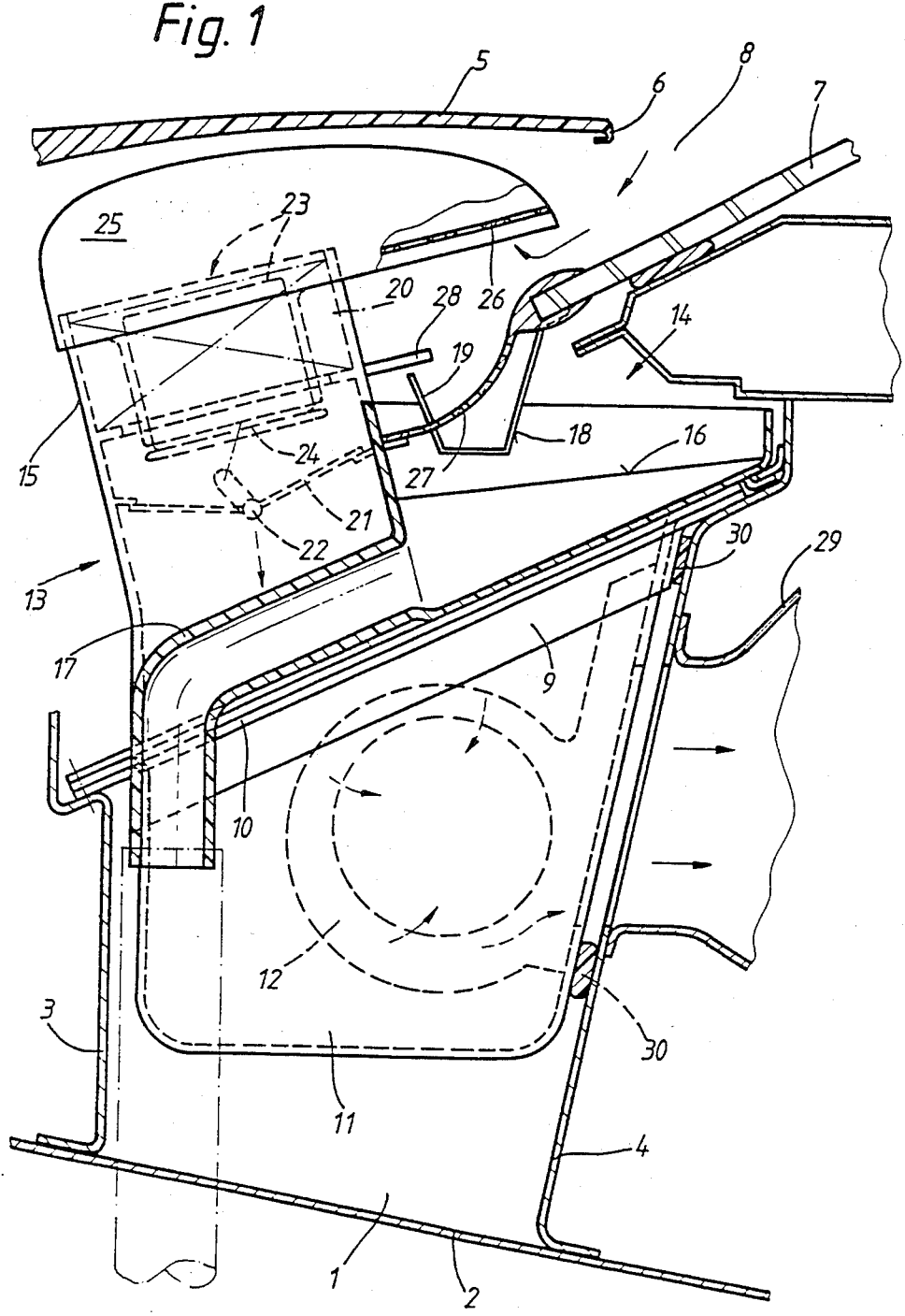
FIG. 1 is a side view, partly in section, of a fresh air supply device inserted into an accessories compartment, constructed in accordance with a preferred embodiment of the invention.

As shown in FIG. 1, an accessories compartment 1 is bounded at the bottom by a bottom sheet metal panel 2. Two other walls of the accessories compartment 1 are formed by the engine compartment partition 3, part of which is shown, and by the front passenger partition 4 spaced apart from said partition 3, while the side walls consist of parts (not shown in detail) of the vehicle body. The accessories compartment 1 is covered over by a swivelable hood 5, the rear edge 6 of which extends close to the windscreen 7, so that a gap 8 is formed.

In the middle region of the accessories compartment 1 the engine compartment partition 3 and the passenger compartment partition 4 are connected together by a frame 10 ending in a flange 9. A bottom trough-like casing part 11, which accommodates a previously mounted blower 12, is suspended from above in said frame 10. An upper casing part 13, consisting essentially of a water separator 14 and a connection piece 15 integral with and projecting above said separator 14, is disposed on the lower casing part 11.

As FIG. 2 also shows, the water separator 14 comprises a collecting vessel 16, which rises towards the center rather after the style of a roof as illustrated and of two water outlets 17 leading away from said vessel at the sides. As indicated in FIG. 1, outlets 17 pass through the bottom panel 2 and terminate in spouts (not shown) preventing back flow. At each side the collecting vessel 16 has a cutout 18, in which a water collecting channel 19 is suspended. As can be seen particularly in FIG. 2, the water separator 14 partly surrounds the upstanding connection piece 15, which is provided with a flap arrangement 21 disposed beneath a fine filter 20 indicated in the drawing and adapted to be lifted out in the upward direction. The operating rod 22 of the flap arrangement 21 is connected to a drive unit 23 which rests on a holder 24 (FIG. 1) formed on the outside of the connection piece and covered over by a scoop 25 fitted onto the top of the connection piece 15.

The fresh air entering via the gap 8 is deflected towards the scoop 25, where on the inlet side coarse impurities are separated by a coarse filter 26. Another coarse filter 27 retains coarse particles flowing back from the windscreen 7. Despite the absence of seals between the collecting vessel 16 and the windscreen 7, substantially perfect separation of water is achieved because the collecting vessel 16 extends almost to the passenger compartment partition. The water separated and flowing to the sides through the water collection channels 19 collects in the collecting vessel 16 and is discharged via the water outlets 17. When large amounts of water accumulate, a splash wall 28 projecting from the connecting piece 15 prevents water from reaching the scoop 25. The fresh air entering the latter flows through a fine filter 20, which after removal of the scoop 25 can be lifted out and replaced. Depending on the position of the flap arrangement 21, more or less fresh air flows into the lower casing part 11 and is delivered by the blower 12 in the direction of a heater 29 disposed downstream on the passenger compartment side and only schematically indicated in the drawing, while seals 30, which are compressed on the installation of the fresh air supply device, prevent air from passing into the accessories compartment 1.

Reference is also made to commonly assigned application Ser. No. 072040 to be filed on the same date as the application and based on German Patent Application P 36 23 635.7, filed in Germany on July 12, 1986, which application illustrates and describes a mounting arrangement for a blower of the type which could be utilized in practicing the present invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Fresh air supply device for a motor vehicle compartment provided for accessories and having two closure walls lying spaced apart in the longitudinal direction of the vehicle and formed by an engine compartment partition and a front passenger compartment partition, and also having side parts formed by side parts of the vehicle body, the accessories compartment being covered over by a swivelable hood forming between it and an adjoining windscreen a gap through which fresh air flows to an upper casing part which is constructed as a component unit and with which are associated, in addition to a water separator, a coarse filter and a fine filter which is adapted to be removed in the upward direction, the upper casing part being disposed on a lower casing part equipped with a blower,
    wherein the engine compartment partition and the front passenger compartment partition are connected together in the center of the vehicle by means of a frame in which is suspended from above a bottom trough-like casing part, which is equipped with the blower and is merely supported by means of seals on the front passenger compartment partition, and
    wherein the water separator, which forms an integral component part of the upper casing part disposed thereon, partly surrounds by a collecting vessel, and by two water outlets leading away therefrom, an upwardly projecting connection piece holding the fine filter.

2. Fresh air supply device according to claim 1, wherein the fine filter is covered over by a removable air inlet scoop which on its air inlet side carries the coarse filter.

3. Fresh air supply device according to claim 1, wherein the fine filter is followed on the connection piece side by a flap arrangement which is held by means of a holder mounted on the outside of the connection piece and is operated by a drive unit covered over by the scoop.

4. Fresh air supply device according to claim 1, wherein the collecting vessel is provided with side cutouts, in which water collection channels are suspended which extend to adjacent vehicle windscreen pillars at lateral sides of the vehicle.

5. Fresh air supply device according to claim 2, wherein the fine filter is followed on the connection piece side by a flap arrangement which is held by means of a holder mounted on the outside of the connection piece and is operated by a drive unit covered over by the scoop.

6. Fresh air supply device according to claim 2, wherein the collecting vessel is provided with side cutouts, in which water collection channels are suspended which extend to adjacent vehicle windscreen pillars at lateral sides of the vehicle.

7. Fresh air supply device according to claim 3, wherein the collecting vessel is provided with side cutouts, in which water collection channels are suspended which extend to adjacent vehicle windscreen pillars at lateral sides of the vehicle.

8. Fresh air supply device according to claim 5, wherein the collecting vessel is provided with side cutouts, in which water collection channels are suspended which extend to adjacent vehicle windscreen pillars at lateral sides of the vehicle.

* * * * *